US008849545B2

(12) United States Patent
O'Hear et al.

(10) Patent No.: US 8,849,545 B2
(45) Date of Patent: Sep. 30, 2014

(54) CONTROLLING FUEL INJECTION BASED ON FUEL VOLATILITY

(75) Inventors: Brian L. O'Hear, Sterling Heights, MI (US); Mark D. Carr, Fenton, MI (US); Layne K. Wiggins, Plymouth, MI (US)

(73) Assignee: GM Global Technology Operations LLC

( * ) Notice: Subject to any disclaimer, the term of this patent is extended or adjusted under 35 U.S.C. 154(b) by 876 days.

(21) Appl. No.: 13/041,787

(22) Filed: Mar. 7, 2011

(65) Prior Publication Data
US 2012/0232771 A1 Sep. 13, 2012

(51) Int. Cl.
| F02D 41/04 | (2006.01) |
| F02D 41/06 | (2006.01) |
| F02D 41/00 | (2006.01) |
| F02D 41/10 | (2006.01) |
| F02D 41/18 | (2006.01) |
| F02D 19/06 | (2006.01) |
| F02D 19/08 | (2006.01) |

(52) U.S. Cl.
CPC ........ *F02D 41/10* (2013.01); *F02D 2200/1004* (2013.01); *F02D 41/0025* (2013.01); *F02D 41/182* (2013.01); *F02D 2200/0612* (2013.01); *F02D 2200/022* (2013.01); *F02D 2200/101* (2013.01); *F02D 19/061* (2013.01); *F02D 19/088* (2013.01)
USPC .......................................... 701/104; 701/103

(58) Field of Classification Search
CPC ............ F02D 2200/00; F02D 2200/10; F02D 2200/101; F02D 2200/0611; F02D 2200/0612; F02D 2200/1002; F02D 2200/1004; F02D 41/10; F02D 41/182; F02D 41/0025

USPC .................................................. 701/103, 104
See application file for complete search history.

(56) References Cited

U.S. PATENT DOCUMENTS

| 4,084,240 | A | | 4/1978 | Lappington |
| 4,625,697 | A | | 12/1986 | Hosaka |
| 6,003,496 | A | * | 12/1999 | Maloney ........................ 123/480 |
| 6,079,396 | A | * | 6/2000 | Ament et al. .................. 123/674 |
| 6,360,726 | B1 | * | 3/2002 | Javaherian .................... 123/491 |
| 6,522,024 | B1 | | 2/2003 | Takaoka et al. |
| 6,588,409 | B2 | * | 7/2003 | Maloney et al. .............. 123/686 |
| 6,615,803 | B2 | | 9/2003 | Kojima et al. |
| 6,637,413 | B2 | * | 10/2003 | Maloney et al. .............. 123/491 |
| 6,679,225 | B2 | * | 1/2004 | Robertson et al. ............ 123/436 |
| 6,704,638 | B2 | | 3/2004 | Livshiz et al. |
| 6,712,503 | B2 | | 3/2004 | Lin et al. |
| 6,792,927 | B2 | | 9/2004 | Kobayashi |

(Continued)

FOREIGN PATENT DOCUMENTS

| DE | 10346314 A1 | 4/2004 |
| DE | 60122255 T2 | 6/2007 |

(Continued)

*Primary Examiner* — Hieu T Vo
*Assistant Examiner* — Arnold Castro

(57) ABSTRACT

A system according to the principles of the present disclosure includes a fuel volatility module, a temperature generation module, and a fuel control module. The fuel volatility module estimates a volatility of fuel provided to an engine based on an engine torque and an engine speed. The temperature generation module generates a temperature of an intake valve of the engine. The fuel control module selectively increases an amount of fuel provided to the engine based on the temperature of the intake valve, the engine torque, and the fuel volatility.

20 Claims, 5 Drawing Sheets

(56) References Cited

U.S. PATENT DOCUMENTS

| | | | |
|---|---|---|---|
| 6,817,342 B2 * | 11/2004 | Schule | 123/486 |
| 6,935,311 B2 | 8/2005 | Visser et al. | |
| 7,050,901 B2 * | 5/2006 | Yasuda et al. | 701/113 |
| 7,059,313 B2 | 6/2006 | Lippa | |
| 7,128,057 B2 | 10/2006 | Wiese et al. | |
| 7,163,002 B1 * | 1/2007 | Halverson et al. | 123/491 |
| 7,212,915 B2 | 5/2007 | Dudek | |
| 7,246,004 B2 | 7/2007 | Dudek et al. | |
| 7,367,223 B2 | 5/2008 | Kettl et al. | |
| 7,448,360 B2 * | 11/2008 | Kita | 123/436 |
| 7,761,220 B2 * | 7/2010 | Asano et al. | 701/104 |
| 7,778,763 B2 * | 8/2010 | Ueda et al. | 701/104 |
| 7,904,234 B2 * | 3/2011 | Ruggiano et al. | 701/113 |
| 8,000,880 B2 * | 8/2011 | Shibata et al. | 701/104 |
| 8,600,649 B2 * | 12/2013 | Gourves | 701/113 |
| 2002/0040692 A1 | 4/2002 | LaPointe et al. | |
| 2003/0213475 A1 * | 11/2003 | Robertson et al. | 123/491 |
| 2004/0069273 A1 | 4/2004 | Visser et al. | |
| 2006/0130817 A1 * | 6/2006 | Gonze et al. | 123/520 |
| 2007/0163542 A1 | 7/2007 | Kettl et al. | |
| 2008/0270006 A1 * | 10/2008 | Asano et al. | 701/103 |
| 2009/0265081 A1 | 10/2009 | Shibata et al. | |
| 2009/0287396 A1 * | 11/2009 | Ueda et al. | 701/104 |
| 2010/0191447 A1 * | 7/2010 | Gourves | 701/113 |

FOREIGN PATENT DOCUMENTS

| | | |
|---|---|---|
| EP | 1178203 A2 | 2/2002 |
| EP | 1775584 A2 | 4/2007 |
| JP | 2004286037 A | 10/2004 |
| JP | 2004346912 A | 12/2004 |

\* cited by examiner

CONTROLLING FUEL INJECTION BASED ON FUEL VOLATILITY

FIELD

The present disclosure relates to systems and methods for determining fuel volatility and controlling fuel injection during transient events based on fuel volatility.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engine control systems have been developed to control fuel injection based on an air/fuel ratio of an engine. The air/fuel ratio is typically determined based on an oxygen level detected by an oxygen sensor. The oxygen sensor may not detect oxygen levels as accurately as desired when the engine is initially started. Thus, some engine control systems operate in an open-loop mode when an engine is initially started. In the open-loop mode, fuel injection is controlled independent of the oxygen sensor output.

Fuel quality may vary depending on a time of year and a geographic location. In the open-loop mode, variations in fuel quality may cause drivability issues such as engine stalls and vehicle vibrations. Also, additional fuel is required during transient maneuvers such as increasing a throttle position to wide open throttle. Traditional engine control systems do not account for variations in fuel quality when increasing fuel injection amounts during transient maneuvers while operating in the open-loop mode.

SUMMARY

A system according to the principles of the present disclosure includes a fuel volatility module, a temperature generation module, and a fuel control module. The fuel volatility module estimates a volatility of fuel provided to an engine based on an engine torque and an engine speed. The temperature generation module generates a temperature of an intake valve of the engine. The fuel control module selectively increases an amount of fuel provided to the engine based on the temperature of the intake valve, the engine torque, and the fuel volatility.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
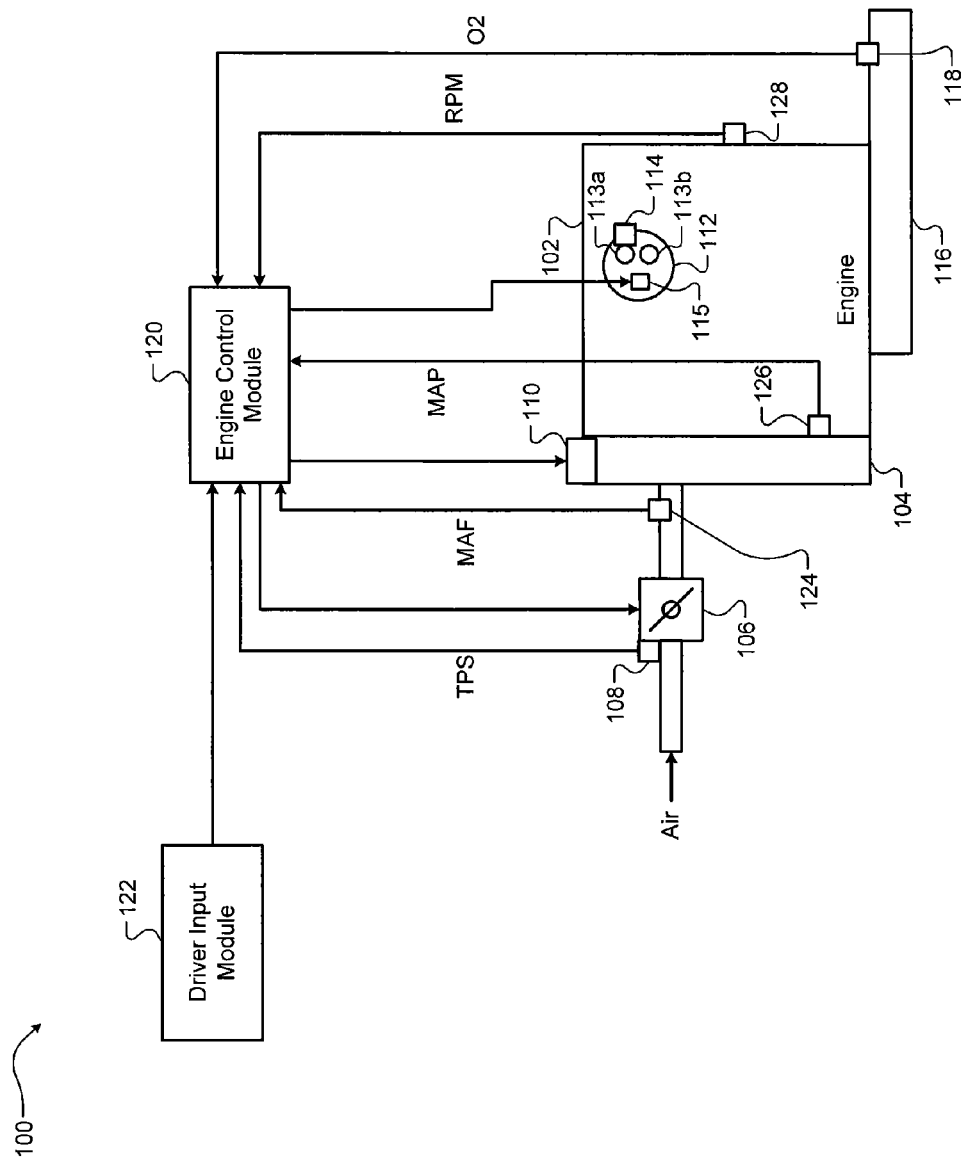
FIG. 1 is a functional block diagram of an example engine system according to the principles of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order and/or omitted without altering the principles of the present disclosure. In addition, a system may execute steps from a method and a method may execute actions performed by the system.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Typical engine control systems increase a fuel injection amount by a predetermined amount during transient maneuvers when operating independent of an output of an oxygen sensor (i.e., in an open-loop mode). The predetermined amount is selected based on an assumed fuel quality. If the actual fuel quality is better than the assumed fuel quality, then the injection amount may be increased more than necessary. In turn, fuel economy and emissions may be worsened. If the actual fuel quality is worse than the assumed fuel quality, then the injection amount may not be increased sufficiently. In turn, drivability issues (e.g., engine stalls, vibrations) may occur.

Fuel quality may be measured in terms of a drivability index (DI) of a fuel. The DI of a fuel may be determined based on temperatures at which various percentages of the fuel vaporize. Fuel quality decreases as the DI increases. A fuel having poor fuel quality may be unable to vaporize to the extent expected when the temperature of an engine is low, such as when the engine is initially started. An inability to vaporize as expected may adversely affect combustion, causing the drivability issues.

A system and method according to the principles of the present disclosure determines a fuel quality based on engine operating conditions, and may increase an amount of fuel provided to an engine in an open-loop mode based on the fuel quality. The amount of fuel provided to the engine during transient maneuvers may be optimized based on the fuel quality increase amount and an intake valve temperature. In this manner, fuel economy, emissions, and drivability may be improved.

Referring now to FIG. 1, a functional block diagram of an engine system 100 for a vehicle is presented. The engine system 100 includes an engine 102 that produces drive torque. Air is drawn into the engine 102 through an intake manifold 104. A throttle valve 106 varies the volume of air drawn into the intake manifold 104. A throttle position sensor (TPS) 108 outputs the position of the throttle valve 106. The air mixes with fuel from a fuel injector 110 to form an air/fuel mixture.

The air/fuel mixture is combusted within one or more cylinders of the engine 102, such as cylinder 112. The air/fuel mixture enters the cylinder 112 through an intake valve 113a and exits the cylinder 112 through an exhaust valve 113b. A temperature sensor 114, such as a thermocouple, outputs the temperature of the intake valve 113a. While the engine 102 may include multiple cylinders, for illustration purposes, only the representative cylinder 112 is shown. For example only, the engine 102 may include 2, 3, 4, 5, 6, 8, 10, and/or 12 cylinders.

In various engine systems, such as the engine system 100, combustion of the air/fuel mixture is initiated by spark provided by a spark plug 115. The spark timing may be specified relative to a predetermined position of the piston, such as piston top-dead-center (TDC). Although the engine 102 is depicted as including the spark plug 115, the engine 102 may be any suitable type of engine, such as a compression combustion type engine or a hybrid type engine and may not include the spark plug 115.

Exhaust gas resulting from combustion is expelled from the cylinders to an exhaust system 116. The exhaust system 116 includes an oxygen (O2) sensor 118 that outputs the concentration of oxygen in exhaust gas passing the oxygen sensor 118.

A driver instructs the engine 102 to start, and an engine control module (ECM) 120 then activates a starter (not shown) to start the engine 102. The driver may turn a key and/or push a button to instruct the engine 102 to start. The ECM 120 receives the driver's instruction via driver input received from a driver input module 122.

The ECM 120 may also receive a mass airflow (MAF) from a mass airflow sensor 124, a manifold air pressure (MAP) from a manifold air pressure sensor 126, and an engine speed from an engine speed sensor 128. The engine speed may be in revolutions per minute (RPM). Mass airflow is the amount of air flowing into the intake manifold 104. Manifold air pressure is the pressure within the intake manifold 104.

The ECM 120 regulates opening of the throttle valve 106 based on a driver input received from the driver input module 122. The driver input may be based on a position of an accelerator pedal and/or based on a cruise control setting. In this manner, the ECM 120 controls the amount of air drawn into the intake manifold 104.

The ECM 120 also regulates the amount of fuel injected by the fuel injector 110. For example, the ECM 120 may generate a pulse for a period of time. The fuel injector 110 may open while the pulse is generated. Accordingly, the amount of fuel injected by the fuel injector 110 may be adjusted by adjusting the length of time that the pulse is generated (i.e., the pulse width). The fuel injector 110 may inject fuel at a central location, such as into the intake manifold 104, or at multiple locations, such as near the intake valve 113a of the cylinder 112. Alternatively, the fuel injector 110 may inject fuel directly into the cylinder 112.

Generally, the ECM 120 regulates the air/fuel mixture to maintain a stoichiometric air/fuel mixture. The ECM 120 then adjusts the air/fuel mixture based on the output of the oxygen sensor 118. The output of the oxygen sensor 118, however, may be unreliable when the temperature of the oxygen sensor 118 is less than a threshold temperature. For example, the temperature of the oxygen sensor 118 is likely less than the threshold temperature for a period of time after the engine 102 is started.

Accordingly, the ECM 120 operates in an open-loop mode when the engine 102 is started. The ECM 120 regulates the air/fuel mixture independent of the output of the oxygen sensor 118 while operating in the open-loop mode. Quality of the fuel provided to the engine 102, however, may affect the air/fuel mixture. More specifically, the air/fuel mixture may effectively be lean (less fuel than the stoichiometric mixture) when the fuel quality is poor. This lean quality of the air/fuel mixture may be attributable to the inability of the fuel to vaporize and combust to the extent expected when the engine temperature is low.

Generally, fuel quality is measured in terms of a drivability index (DI). A DI of a fuel may be determined based on temperatures at which various percentages of the fuel vaporize. For example only, DI of a fuel may be determined using the equation:

$$DI = 1.5 * T10 + 3.0 * T50 + T90,$$

where T10 is the temperature (° F.) at which 10% of the fuel is vaporized, T50 is the temperature (° F.) at which 50% of the fuel is vaporized, and T90 is the temperature (° F.) at which 90% of the fuel is vaporized. Fuel quality decreases as DI increases. In other words, a poor quality fuel has a higher DI than a higher quality fuel. Poor quality fuels may be unable to vaporize to the extent expected when the engine temperature is low.

As stated above, the ECM 120 operates in the open-loop mode when the engine temperature is low. Accordingly, the fuel injected may be unable to vaporize to the extent expected when in the open-loop mode if the fuel quality is poor. Fuel that fails to vaporize may be only partially combusted or not combusted. Incomplete or non-combustion may affect emissions, cause the engine 102 to stall, and/or cause observable vibrations within the vehicle.

The ECM 120 determines a fuel quality and increases the amount of fuel injected by the injector 110 when in the open-loop mode based on the fuel quality. The amount of fuel injected by the injector 110 is increased by an additional amount during transient maneuvers based on the fuel quality increase amount and an intake valve temperature. In this manner, fuel economy, emissions, and drivability may be improved.

Figure 2:
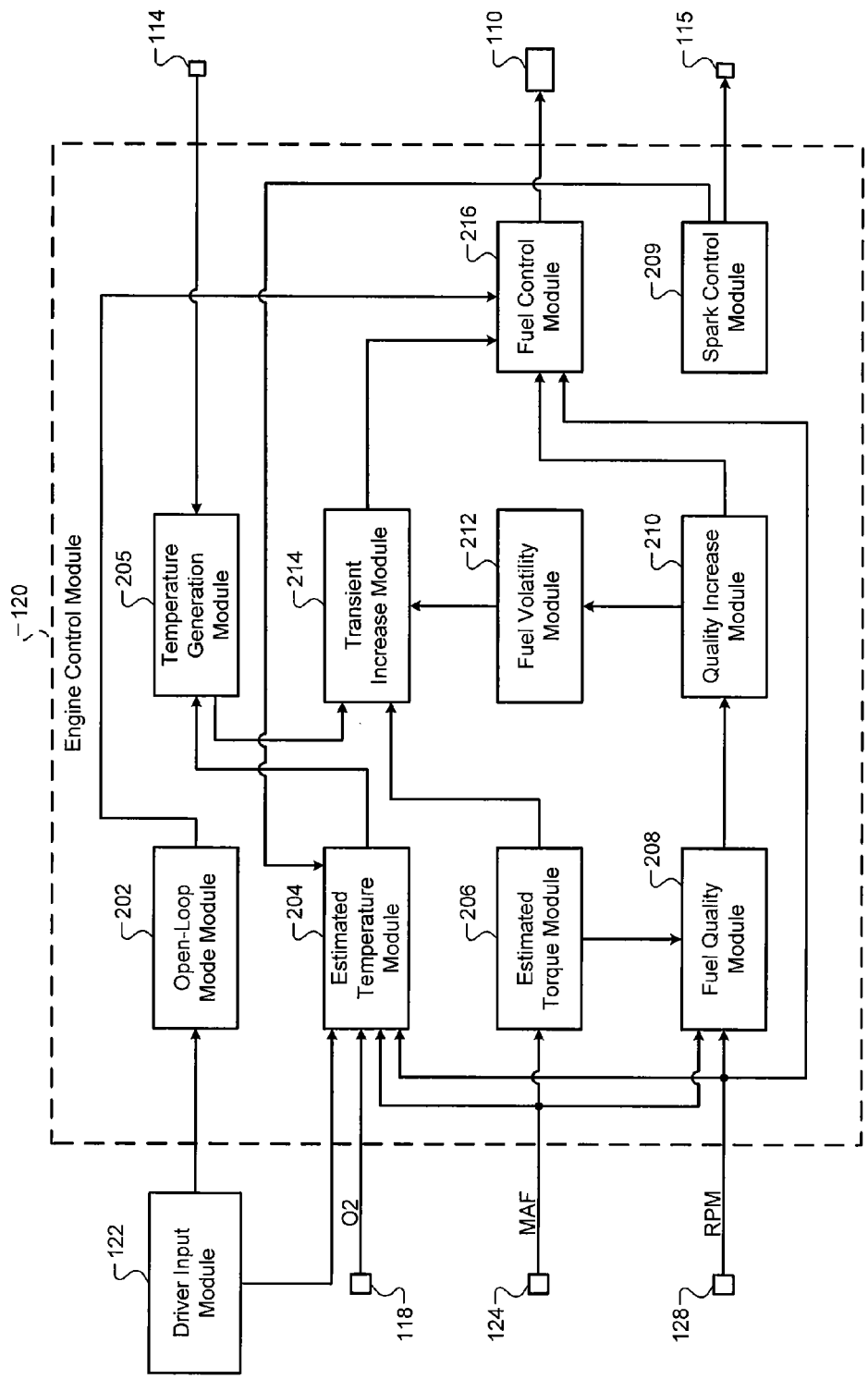
FIG. 2 is a functional block diagram of an example engine control system according to the principles of the present disclosure.

Referring now to FIG. 2, an example implementation of the ECM 120 is illustrated. The ECM 120 includes an open-loop mode module 202 that activates the open-loop mode when the engine 102 is started. The open-loop mode module 202 may receive the driver input from the driver input module 122 and determine that the engine 102 is started based on the driver input. The open-loop mode module 202 deactivates the open-loop mode when the output of the oxygen sensor 118 is likely reliable. The open-loop mode module 202 may deactivate the open-loop mode when an operating period of the engine 102 is greater than or equal to a predetermined period.

The ECM 120 also includes an estimated temperature module 204, a temperature generation module 205, an estimated torque module 206, and a fuel quality module 208. The estimated temperature module 204 estimates an intake valve temperature. The estimated temperature module 204 may estimate the intake valve temperature based on the operating period of the engine 102, an equivalence ratio of the engine 102, the spark timing of the engine 102, the speed of the engine 102, the amount of air delivered to each cylinder of the engine 102 (i.e., the air per cylinder), the coolant temperature of the engine 102, the manifold air pressure of the engine 102, and/or the mass airflow of the engine 102. In addition, the estimated temperature module 204 may estimate the intake valve temperature based on a hardness of the intake valve 113a, which may be measured.

The estimated temperature module 204 may receive the driver input from the driver input module 122 and may determine the engine operating period based on the driver input. The estimated temperature module 204 may increase the intake valve temperature as the engine operating period increases from an ignition-key-on time to a subsequent time. For example only, the estimated intake valve temperature may be 100 degrees Celsius (° C.) when the engine operating period is 30 seconds.

The estimated temperature module 204 may receive the oxygen concentration from the oxygen sensor 118 and may determine the equivalence ratio of the engine 102 based on the oxygen concentration. The estimated temperature module 204 may receive the spark timing from a spark control module 209 that controls the timing of the spark produced by the spark plug 115. The estimated temperature module 204 may receive the engine speed from the engine speed sensor 128. The estimated temperature module 204 may receive the mass airflow from the mass airflow sensor 124 and determine the air per cylinder based on the mass airflow.

The temperature generation module 205 generates the temperature of the intake valve 113a. The temperature generation module 205 may receive the measured intake valve temperature from the temperature sensor 114 and may generate the temperature of the intake valve 113a based on the measured intake valve temperature. In addition, the temperature generation module 205 may receive the estimated intake valve temperature from the estimated temperature module 204 and may generate the temperature of the intake valve 113a based on the estimated intake valve temperature.

The estimated torque module 206 estimates the amount of torque that the engine 102 is capable of producing under the current operating conditions. For example only, the operating conditions may include the mass airflow (MAF), intake air temperature (IAT), oil temperature (OT), engine coolant temperature (ECT), spark timing, and/or any suitable operating conditions. The estimated torque module 206 may receive the mass airflow from the mass airflow sensor 124. In various implementations, the estimated torque may also be determined based on characteristics of the engine 102, such as engine friction and/or any other suitable engine characteristics.

The estimated torque module 206 may calculate an air per cylinder (APC) based on the mass airflow. Air per cylinder is the amount of air delivered to the cylinder 112. The estimated torque module 206 may divide the estimated air per cylinder by a predetermined air per cylinder to obtain an air per cylinder percent. The predetermined air per cylinder may correspond to the throttle valve 106 at a wide open throttle position. The estimated torque module 206 may estimate torque based on the air per cylinder percent. For example, the estimated torque may be the maximum amount of torque that the engine 102 is capable of producing when the air per cylinder percent is 100.

The fuel quality module 208 determines a value indicating the quality of fuel provided to the engine 102 based on operating conditions of the engine 102. The fuel quality module 208 may receive the mass airflow from the mass airflow sensor 124 and the engine speed from the engine speed sensor 128. The fuel quality module 208 may also receive the estimated torque from the estimated torque module 206 and/or calculate the estimated torque based on the mass airflow. The fuel quality module 208 determines the fuel quality value based on the estimated torque and the engine speed.

For example, the fuel quality module 208 may calculate a change in the engine speed and divide the engine speed change by a predetermined speed change to obtain a speed ratio. The predetermined speed change may correspond to a maximum speed change over a period between two firing events when the engine 102 combusts a fuel of known quality. The fuel quality module 208 may also divide the estimated torque by a predetermined torque to obtain a torque ratio. The predetermined torque may correspond to a maximum amount of torque that the engine 102 is capable of producing when combusting a fuel of known quality. The fuel quality module 208 may multiply the speed ratio and the torque ratio to obtain the fuel quality value. Further discussion of fuel quality determination can be found in commonly assigned U.S. Patent Pub. No. 2009/0265081, entitled "Fuel Quality Detection using Torque and Engine Speed."

A quality increase module 210 receives the fuel quality value from the fuel quality module 208 and, based on the fuel quality value, determines a quality increase amount by which fuel provided to the engine 102 is increased. The quality increase module 210 may determine that fuel quality is poor when the fuel quality value is greater than a predetermined value. The predetermined value may be set based on a minimum value for a fuel known to be of poor quality. Alternatively, the predetermined value may be set based on a maximum value for a fuel known to be of acceptable (i.e., not poor) quality. For example only, the predetermined value may be one. The quality increase module 210 may set the quality increase amount to zero when the fuel quality is not poor, and may set the quality increase amount to a predetermined amount when the fuel quality is poor. In addition, the quality increase module 210 may increase the quality increase amount as the fuel quality value increases.

A fuel volatility module 212 receives the quality increase amount from the quality increase module 210 and estimates a value indicating the volatility of a fuel based on the quality increase amount. The fuel volatility module 212 may divide the quality increase amount by a predetermined increase amount to obtain the fuel volatility. The quality increase amount may be a maximum value of the quality increase amount for a current ignition cycle. The predetermined increase amount may be a maximum increase amount for any ignition cycle. For example only, a fuel volatility value of one may indicate that the engine 102 will stall if no additional fuel is provided, and a fuel volatility value of zero may indicate that no additional fuel is required to prevent a stall.

A transient increase module 214 receives the fuel volatility value and, based on the fuel volatility value, determines a transient increase amount by which fuel provided to the engine 102 is increased during a transient maneuver. A transient maneuver is any maneuver that affects the engine speed, such as adjusting the throttle valve 106 to a wide open throttle position or switching on an air conditioner (not shown). The transient increase module 214 may also receive the intake valve temperature from the temperature generation module 205 and the estimated torque from the estimated torque module 206. The transient increase module 214 may determine the transient increase amount based on the intake valve temperature and the estimated torque.

The transient increase module 214 may include a lookup table that relates intake valve temperatures and estimated torques to fuel increase amounts. The fuel increase amounts may represent the minimum amount of additional fuel required to avoid drivability issues when combusting a poor quality fuel. The transient increase module 214 may refer to the lookup table to determine a fuel increase amount based on the intake valve temperature and the estimated torque, and may multiply the fuel increase amount by the fuel volatility value to obtain the transient increase amount.

Alternatively, the transient increase module 214 may receive the intake valve temperature from the estimated temperature module 204 and the air per cylinder percent from the estimated torque module 206. As discussed above, the air per cylinder percent is the ratio of the estimated air per cylinder to the predetermined air per cylinder, which may correspond to the throttle valve 106 at a wide open throttle position. The transient increase module 214 may determine the transient increase amount based on the intake valve temperature and the air per cylinder percent.

The transient increase module 214 may include a lookup table that relates intake valve temperatures and air per cylinder percentages to fuel increase amounts. The fuel increase amounts may represent the minimum amount of additional fuel required to avoid drivability issues when combusting a poor quality fuel. The transient increase module 214 may refer to the lookup table to determine a fuel increase amount based on the intake valve temperature and the air per cylinder percent. The transient increase module 214 may multiply the fuel increase amount by the fuel volatility value to obtain the transient increase amount.

A fuel control module 216 controls the amount of fuel injected by the injector 110. The fuel control module 216 determines whether the open-loop mode is active based on input received from the open-loop mode module 202. When the open-loop mode is active, the fuel control module 216 controls the injection amount independent of the output of the oxygen sensor 118. In addition, the fuel control module 216 may receive the engine speed from the engine speed sensor 128 and control the injection amount based on a change in the engine speed when the open-loop mode is active. The fuel control module 216 may include a lookup table that relates engine speed changes to injection amounts.

The fuel control module 216 receives the quality increase amount from the quality increase module 210 and the transient increase amount from the transient increase module 214. The fuel control module 216 increases the injection amount based on the quality increase amount and the transient increase amount. The fuel control module 216 may increase the injection amount by the sum of the quality increase amount and the transient increase amount.

Figure 3:
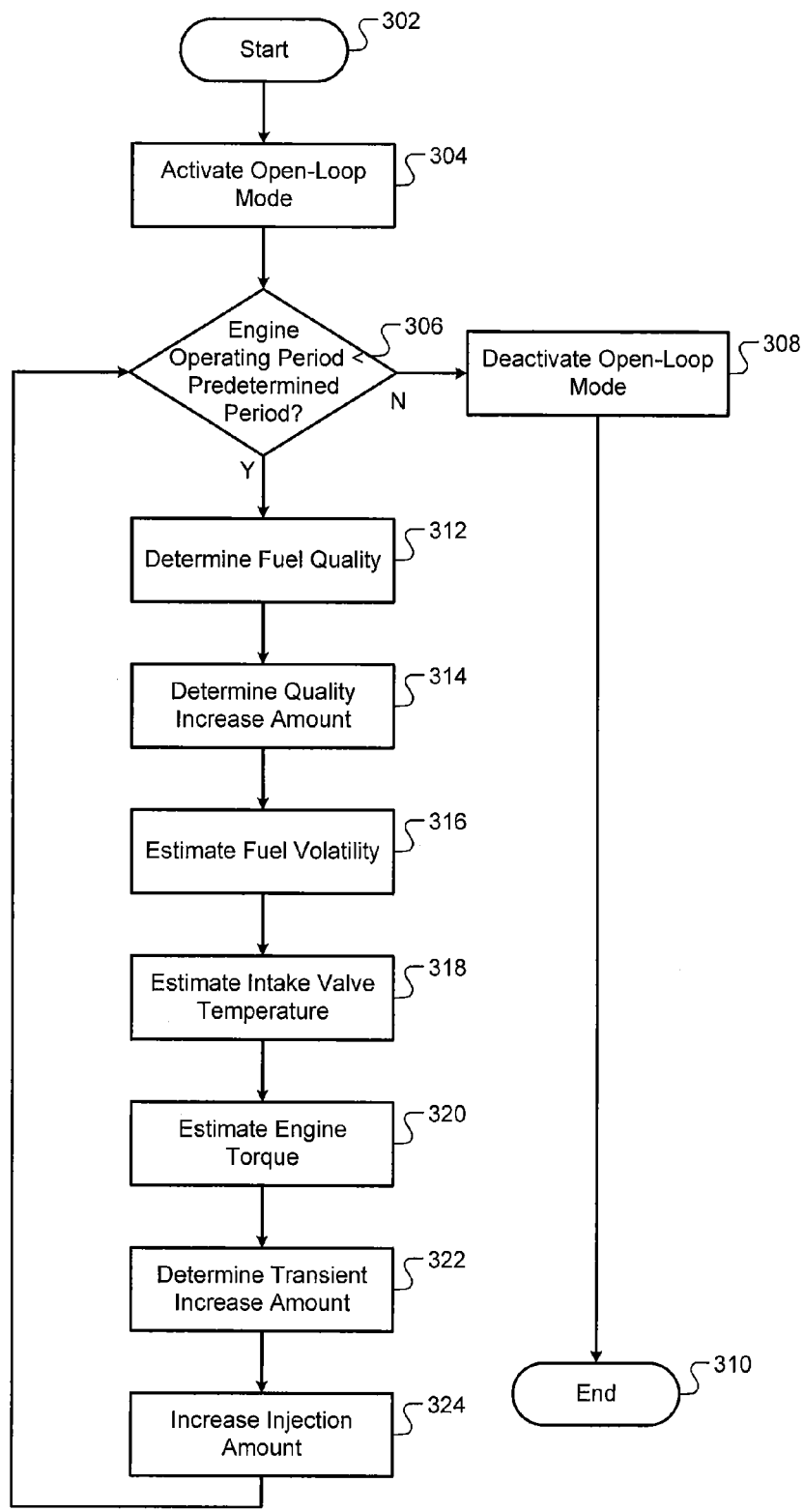
FIG. 3 is a flowchart illustrating an example engine control method according to the principles of the present disclosure.

Referring now to FIG. 3, a method according to the principles of the present disclosure begins at 302. At 304, the method activates an open-loop mode. The method may activate the open-loop mode when an engine is started. In the open-loop mode, an air/fuel ratio of an engine is controlled independent of the output of sensors detecting oxygen and/or nitrogen oxide levels in the exhaust. For example only, an engine may be controlled based on engine speed when the open-loop mode is active.

At 306, the method determines whether an engine operating period is less than a predetermined period. If 306 is false, the method deactivates the open-loop mode at 308 and ends at 310. If 306 is true, the method continues at 312. The predetermined period may be a period of engine operation after which the output of exhaust gas sensors is likely reliable, and may be empirically determined. Thus, the open-loop mode may remain active until the exhaust gas sensor output is likely reliable.

At 312, the method determines a fuel quality value that is inversely related to fuel quality. The method may determine the fuel quality value based on an estimated torque and a change in an engine speed, as discussed above with reference to FIG. 2. For example, the method may determine a torque ratio and a speed ratio, and the method may multiply the torque ratio and the speed ratio to obtain the fuel quality value.

At 314, the method determines a quality increase amount based on the fuel quality value. The quality increase amount is an amount by which fuel provided to an engine is increased. The method may refer to a lookup table that relates fuel quality values to quality increase amounts. The quality increase amounts in the lookup table may be predetermined to prevent drivability issues such as engine stalls and vibrations.

At 316, the method estimates a fuel volatility value that is inversely related to fuel volatility. The method may estimate the fuel volatility value based on the quality increase amount, as discussed above with reference to FIG. 2. For example, the method may divide the quality increase amount by a maximum increase amount to obtain the fuel volatility. Thus, the quality increase amount may be normalized using the maximum increase amount in order to estimate the fuel volatility value.

At 318, the method estimates an intake valve temperature. The estimated intake valve temperature may increase as an operation period of an engine increases. For example only, the estimated intake valve temperature may be 100° C. when the engine operating period is 30 seconds.

At 320, the method estimates the amount of torque produced by an engine. The method may obtain the estimated torque based on a mass airflow of an engine. For example, the method may estimate the amount of air entering each cylinder of the engine (i.e., the air per cylinder) using the mass airflow, and may divide the estimated air per cylinder by a maximum air per cylinder to obtain an air per cylinder percent. The method may then obtain the estimated torque based on a predetermined relationship between the air per cylinder percent and the estimated torque. The predetermined relationship may be represented in the form of a lookup table or an equation.

At 322, the method determines a transient increase amount. The method may determine the transient increase amount based on the intake valve temperature, the estimated torque, and the quality increase amount. The method may refer to a lookup table that relates intake valve temperatures and estimated torques to fuel increase amounts. The fuel increase amounts may represent the minimum amount of additional fuel required to avoid drivability issues when combusting a poor quality fuel. The method may refer to the lookup table to determine a fuel increase amount based on the intake valve temperature and the estimated torque, and may multiply the fuel increase amount by the fuel volatility value to obtain the transient increase amount.

Alternatively, the method may determine the transient increase amount based on the intake valve temperature, the air per cylinder percent, and the quality increase amount. The method may refer to a lookup table that relates intake valve temperatures and air per cylinder percents to fuel increase amounts. The fuel increase amounts in the lookup table may be predetermined to prevent drivability issues such as engine stalls and vehicle vibrations. The method may refer to the lookup table to determine a fuel increase amount based on the intake valve temperature and the air per cylinder percent, and may multiply the fuel increase amount by the fuel volatility value to obtain the transient increase amount.

At 324, the method increases the amount of fuel provided to an engine (i.e., the injection amount) and continues at 306. The method may increase the injection amount based on the quality increase amount and the transient increase amount. The method may increase the injection amount by the sum of the quality increase amount and the transient increase amount.

Figures 4A, 4B, 4C:
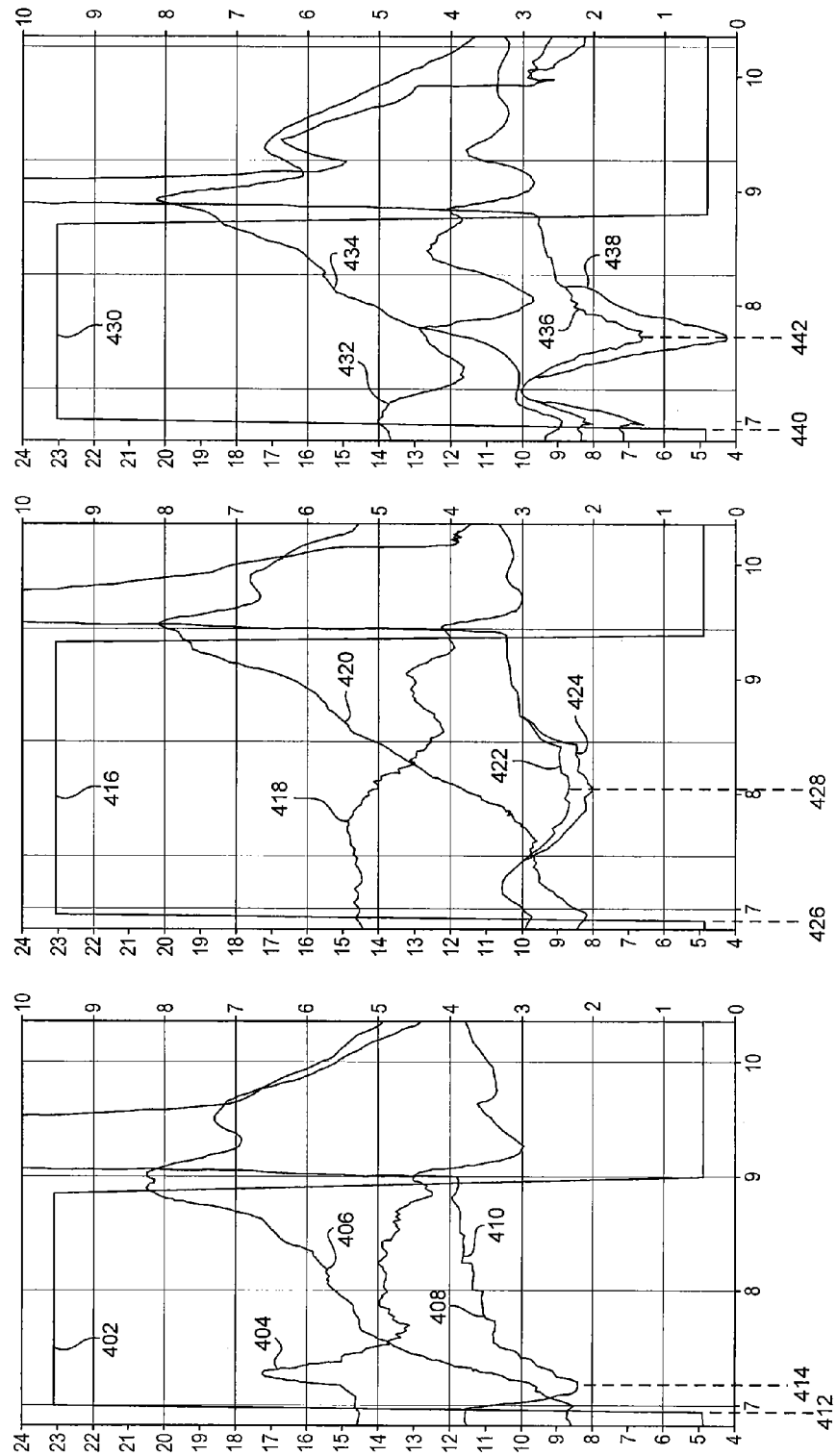
FIGS. 4A through 4C are graphs illustrating example engine control signals for various fuel qualities according to the principles of the present disclosure.

Referring now to FIGS. 4A through 4C, example engine control signals for various fuel qualities according to the principles of the present disclosure are illustrated. FIG. 4A corresponds to fuel having a first quality that is acceptable (i.e., not poor), FIG. 4B corresponds to fuel having a second quality that is worse than the first quality, and FIG. 4C corresponds to fuel having a third quality that is worse than the second quality.

FIG. 4A shows sensor signals and control signals indicating that no additional fuel is supplied during a transient maneuver when fuel having the first quality is combusted. The sensor signals include a pedal position 402, a measured air/fuel ratio 404, and an engine speed 406. The control signals include a commanded air/fuel ratio 408 unadjusted for drivability during transient maneuvers, and a commanded air/fuel ratio 410 adjusted for drivability during transient maneuvers.

At 412, the pedal position 402 is increased to a wide open throttle position, initiating the transient maneuver. At 414, the commanded air/fuel ratio 410 is approximately equal to the commanded air/fuel ratio 408, indicating that no additional fuel is supplied during the transient maneuver. The first quality is determined and the commanded air/fuel ratio 410 is not adjusted to increase fuel supply during the transient maneuver based on the first quality. In turn, fuel economy and emissions are improved.

FIG. 4B shows sensor signals and control signals indicating that fuel supply is increased by a first additional amount during a transient maneuver when fuel having the second quality is combusted. The sensor signals include a pedal position 416, a measured air/fuel ratio 418, and an engine speed 420. The control signals include a commanded air/fuel ratio 422 unadjusted for drivability during transient maneuvers, and a commanded air/fuel ratio 424 adjusted for drivability during transient maneuvers.

At 426, the pedal position 416 is increased to a wide open throttle position, initiating the transient maneuver. At 428, the commanded air/fuel ratio 424 is less than the commanded air/fuel ratio 422, indicating that additional fuel is supplied during the transient maneuver. The second quality is determined and the commanded air/fuel ratio 424 is adjusted to increase fuel supply by the first additional amount during the transient maneuver based on the second quality. The first additional amount is selected based on engine operating conditions, such as intake valve temperature and mass airflow, to prevent drivability issues while minimizing degradations in fuel economy and emissions.

FIG. 4C shows sensor signals and control signals indicating that fuel supply is increased by a second additional amount during a transient maneuver when fuel having the third quality is combusted. The sensor signals include a pedal position 430, a measured air/fuel ratio 432, and an engine speed 434. The control signals include a commanded air/fuel ratio 436 unadjusted for drivability during transient maneuvers, and a commanded air/fuel ratio 438 adjusted for drivability during transient maneuvers.

At 440, the pedal position 430 is increased to a wide open throttle position, initiating the transient maneuver. At 442, the commanded air/fuel ratio 438 is less than the commanded air/fuel ratio 436, indicating that additional fuel is supplied during the transient maneuver. The third quality is determined and the commanded air/fuel ratio 438 is adjusted to increase fuel supply by the second additional amount during the transient maneuver based on the second quality. The second additional amount is selected based on engine operating conditions, such as intake valve temperature and mass airflow, to prevent drivability issues while minimizing degradations in fuel economy and emissions.

Figure 5B:
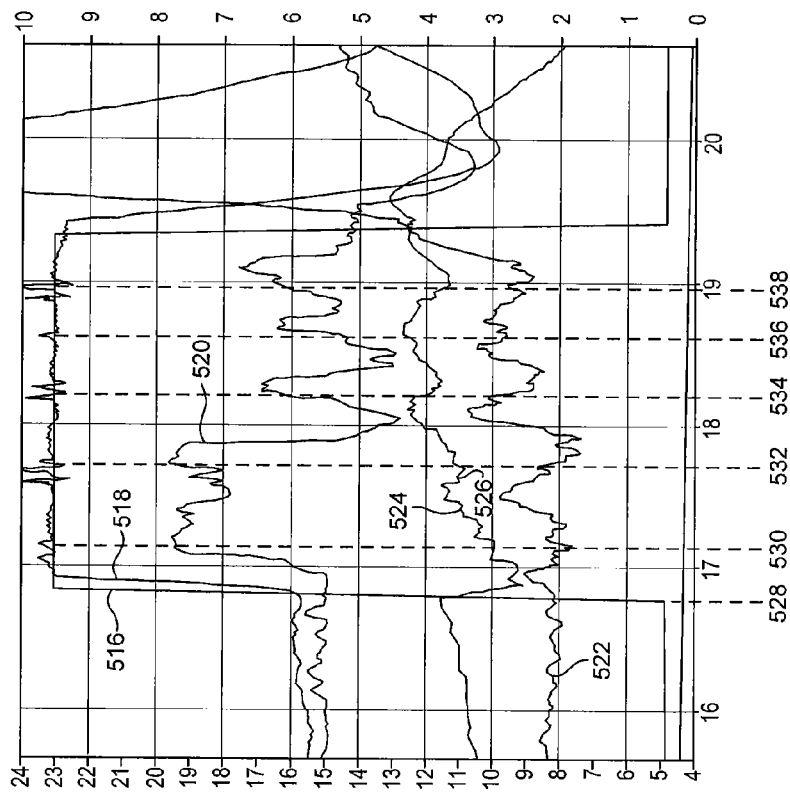
FIGS. 5A and 5B are graphs illustrating example engine control signals for various fuel qualities according to the prior art.
Figure 5A:
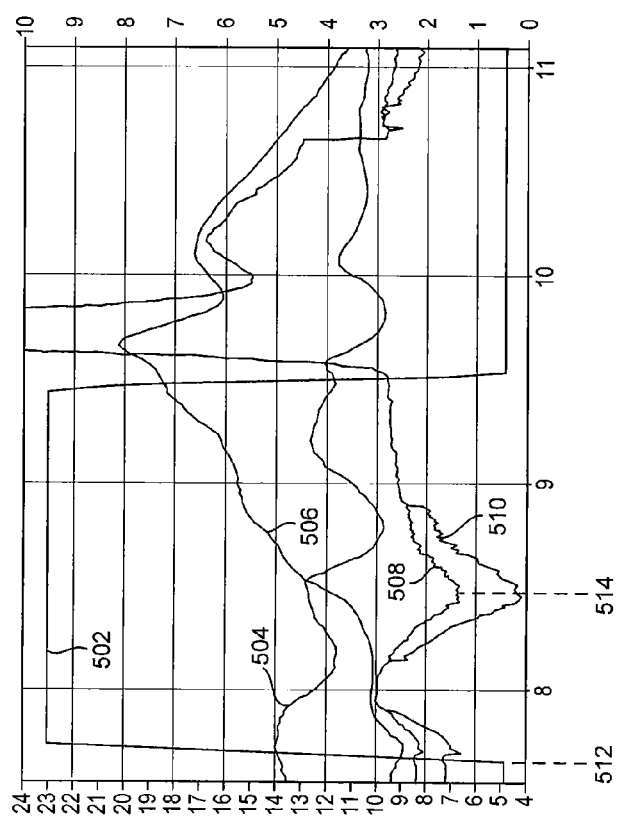

Referring to FIGS. 5A and 5B, example engine control signals for various fuel qualities according to the prior art are illustrated. FIG. 5A corresponds to fuel having a first quality that is acceptable (i.e., not poor), and FIG. 5B corresponds to fuel having a second quality that is worse than the first quality.

FIG. 5A shows sensor signals and control signals indicating that fuel supply is increased by a standard amount during a transient maneuver even when fuel having an acceptable quality is combusted. The sensor signals include a pedal position 502, a measured air/fuel ratio 504, and an engine speed 506. The control signals include a commanded air/fuel ratio 508 unadjusted for drivability during transient maneuvers, and a commanded air/fuel ratio 510 adjusted for drivability during transient maneuvers.

At 512, the pedal position 502 is increased to a wide open throttle position, initiating the transient maneuver. At 514, the commanded air/fuel ratio 510 is less than the commanded air/fuel ratio 508, indicating that additional fuel is supplied during the transient maneuver. The commanded air/fuel ratio 510 is adjusted to increase fuel supply by the standard amount regardless of the fuel quality. As a result, fuel economy and emissions are unnecessarily degraded while drivability is not improved.

FIG. 5B shows sensor signals and control signals indicating that fuel supply is not increased during a transient maneuver even when fuel having a poor (i.e., not acceptable) quality is combusted. The sensor signals include a pedal position 516, a manifold air pressure 518, a measured air/fuel ratio 520, and an engine speed 522. The control signals include a commanded air/fuel ratio 524 unadjusted for drivability during transient maneuvers, and a commanded air/fuel ratio 526 adjusted for drivability during transient maneuvers.

At 528, the pedal position 516 is increased to a wide open throttle position, initiating the transient maneuver. Between 528 and 530, the commanded air/fuel ratio 510 is equal to the commanded air/fuel ratio 508, indicating that no additional fuel is supplied during the transient maneuver even when combusting fuel have a poor quality. The late combustion occurs when the intake valve is open, causing pressure fluctuations in the intake manifold, as indicated by the fluctuations in the manifold air pressure 518 shown at 530 through 538. The pressure fluctuations yield popping noises that degrade drivability. In addition, the engine speed 522 becomes instable, as shown at 530 through 538, which may cause an engine stall that degrades drivability.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
   a fuel volatility module that estimates a volatility of fuel provided to an engine based on an engine torque and an engine speed;
   a temperature generation module that generates a temperature of an intake valve of the engine; and
   a fuel control module that selectively increases an amount of fuel provided to the engine based on the temperature of the intake valve, the engine torque, and the fuel volatility.

2. A system comprising:
   a fuel volatility module that estimates a volatility of fuel provided to an engine based on an engine torque and an engine speed;
   a temperature generation module that generates a temperature of an intake valve of the engine;
   a fuel control module that selectively increases an amount of fuel provided to the engine based on the temperature of the intake valve, the engine torque, and the fuel volatility; and
   an estimated temperature module that estimates the temperature of the intake valve based on an operating period of the engine from an initial time when an ignition key is switched on to a subsequent time, wherein the temperature generation module generates the temperature of the intake valve based on the estimated temperature.

3. The system of claim 1 further comprising an estimated torque module that estimates the engine torque based on a mass airflow of the engine.

4. The system of claim 3 wherein the estimated torque module calculates an amount of air per cylinder (APC) based on the mass airflow, and estimates the engine torque based on the calculated APC amount and a predetermined APC amount.

5. The system of claim 4 wherein the predetermined APC amount corresponds to a throttle position of wide open throttle.

6. The system of claim 1 further comprising a first increase module that determines a first increase amount based on a quality of fuel provided to the engine, wherein the fuel control module increases the fuel amount provided to the engine based on the first increase amount.

7. The system of claim 6 further comprising a fuel quality module that determines the fuel quality based on the engine speed and a mass airflow of the engine.

8. The system of claim 6 wherein the fuel volatility module estimates the fuel volatility based on the first increase amount and a predetermined increase amount.

9. The system of claim 8 wherein the predetermined increase amount prevents the engine from stalling when the estimated volatility is greater than or equal to a predetermined volatility.

10. The system of claim 6 further comprising a second increase module that determines a second increase amount based on the first increase amount, the engine torque, and the temperature of the intake valve, wherein the fuel control module increases the fuel amount provided to the engine based on the second increase amount.

11. A method comprising:
    estimating a volatility of fuel provided to an engine based on an engine torque and an engine speed;
    generating a temperature of an intake valve of the engine; and
    selectively increasing an amount of fuel provided to the engine based on the temperature of the intake valve, the engine torque, and the fuel volatility.

12. A method comprising:
    estimating a volatility of fuel provided to an engine based on an engine torque and an engine speed;
    generating a temperature of an intake valve of the engine;
    selectively increasing an amount of fuel provided to the engine based on the temperature of the intake valve, the engine torque, and the fuel volatility;
    estimating the temperature of the intake valve based on an operating period of the engine from an initial time when an ignition key is switched on to a subsequent time; and
    generating the temperature of the intake valve based on the estimated temperature.

13. The method of claim 11 further comprising estimating the engine torque based on a mass airflow of the engine.

14. The method of claim 13 further comprising:
    calculating an amount of air per cylinder (APC) based on the mass airflow; and
    estimating the engine torque based on the calculated APC amount and a predetermined APC amount.

15. The method of claim 14 wherein the predetermined APC amount corresponds to a throttle position of wide open throttle.

16. The method of claim 11 further comprising:
    determining a first increase amount based on a quality of fuel provided to the engine; and
    increasing the fuel amount provided to the engine based on the first increase amount.

17. The method of claim 16 further comprising determining the fuel quality based on the engine speed and a mass airflow of the engine.

18. The method of claim 16 further comprising estimating the fuel volatility based on the first increase amount and a predetermined increase amount.

19. The method of claim 18 wherein the predetermined increase amount prevents the engine from stalling when the estimated volatility is greater than or equal to a predetermined volatility.

20. The method of claim 16 further comprising:
    determining a second increase amount based on the first increase amount, the engine torque, and the temperature of the intake valve; and
    increasing the fuel amount provided to the engine based on the second increase amount.

* * * * *